No. 657,281. Patented Sept. 4, 1900.
W. BUTTLER.
VEHICLE DRIVING MECHANISM.
(Application filed July 11, 1900.)
(No Model.)

WITNESSES
INVENTOR
William Buttler
by Bakewell & Bakewell
his atty's

THE NORRIS PETERS CO., PHOTO-LITHO., WASHINGTON, D. C.

UNITED STATES PATENT OFFICE.

WILLIAM BUTTLER, OF REDKEY, INDIANA.

VEHICLE DRIVING MECHANISM.

SPECIFICATION forming part of Letters Patent No. 657,281, dated September 4, 1900.

Application filed July 11, 1900. Serial No. 23,195. (No model.)

*To all whom it may concern:*

Be it known that I, WILLIAM BUTTLER, of Redkey, in the county of Jay and State of Indiana, have invented a new and useful Improvement in Vehicle Driving Mechanism, of which the following is a full, clear, and exact description, reference being had to the accompanying drawings, forming part of this specification, in which—

Figure 1:
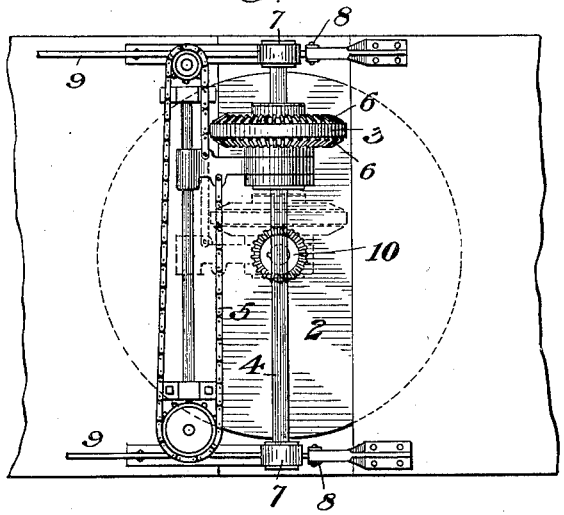
Figure 2:
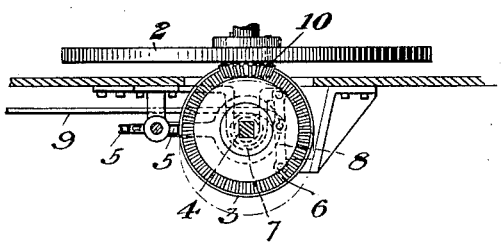

Figure 1 is a bottom plan view of my improved mechanism, and Fig. 2 is a side elevation of the same.

My invention relates to the driving mechanism of motor-driven vehicles, and is designed to improve the friction-gear which has heretofore been employed; and its object is to prevent slipping between the driving-disk and the friction-disk, which often occurs in climbing heavy grades.

To that end it consists in providing the friction-disk with teeth or a gear-wheel secured thereto, which will mesh with the teeth of a gear-wheel secured to the central portion of the driving-disk, the teeth engaging each other when the friction-disk is moved in to give large power and being out of mesh in the other positions.

In the drawings, 2 represents the driving-disk, which is preferably arranged horizontally and is driven by suitable connections with a motor of any desired type. A friction-disk 3 is mounted upon a squared shaft 4, beneath the driving-disk, and is arranged to be moved toward the center of such disk by the chain connection 5. This friction-disk is provided with lateral teeth forming a side gear-wheel 6, the ends of whose teeth are within the periphery of the friction-disk. The squared shaft is mounted in suitable end bearings 7 7, which may be raised and lowered by toggle devices 8, actuated by rods 9. The friction-disk is provided near its center with gear-wheel 10, the teeth of which are arranged to engage the gear-wheel 6 when it is moved along the squared shaft to the proper position and forced upwardly into engagement by the toggle connections.

The operation of my invention will be apparent to those skilled in the art. In the ordinary use of the driving mechanism the periphery of the friction-disk is forced against the base of the driving-disk at different distances from its center to vary the speed, and in climbing heavy grades the friction-disk is lowered and then raised at the proper point to bring the gear-wheel 6 into engagement with the wheel 10, thus giving a positive gear connection and preventing slip of one disk upon the other. In reversing the friction-disk will be lowered and moved to the opposite side of the driving-disk and forced up into engagement therewith.

The advantages of my invention result from applying the gear device to a friction-driving mechanism, thus combining the advantages of both and doing away with the disadvantages of friction-gear.

Many variations may be made in the form and arrangement of the parts without departing from my invention, and the mechanism may be applied in other locations than upon a motor-driven vehicle.

I claim—

1. The combination with a driving-disk having a gear-wheel in one part thereof, of a friction-disk arranged to engage the driving-disk and having teeth to engage the gear-wheel of the driving-disk when in proper position; substantially as described.

2. A friction driving-disk having an annular row of teeth near its center, a friction-disk arranged to engage the driving-disk and having side teeth, and mechanism for shifting the position of the friction-disk and forcing it into engagement with the driving-disk; substantially as described.

In testimony whereof I have hereunto set my hand.

WILLIAM BUTTLER.

Witnesses:
 WILLIAM A. DRAGOO,
 J. B. CLEVENGER.